United States Patent [19]
Lundquist

[11] Patent Number: 6,152,978
[45] Date of Patent: Nov. 28, 2000

[54] SOOT FILTER

[75] Inventor: Joseph E. Lundquist, Oldsmar, Fla.

[73] Assignee: Pall Corporation, East Hills, N.Y.

[21] Appl. No.: 09/117,622

[22] PCT Filed: Jan. 31, 1997

[86] PCT No.: PCT/US97/02181

§ 371 Date: Nov. 30, 1998

§ 102(e) Date: Nov. 30, 1998

[87] PCT Pub. No.: WO97/27927

PCT Pub. Date: Aug. 7, 1997

Related U.S. Application Data

[60] Provisional application No. 60/011,032, Feb. 2, 1996.

[51] Int. Cl.[7] ............................. B01D 39/20; F15B 21/04
[52] U.S. Cl. ............................. 55/385.1; 55/466; 55/522; 55/523; 55/DIG. 5
[58] Field of Search ............................. 55/466, 522, 523, 55/385.3, DIG. 5, DIG. 30, 306, 385.1; 60/278; 123/193 E, 568

[56] References Cited

U.S. PATENT DOCUMENTS

| | | |
|---|---|---|
| Re. 33,327 | 9/1990 | Hackman et al. . |
| 2,757,654 | 8/1956 | White ...................................... 123/568 |
| 3,042,014 | 7/1962 | Falzone .................................. 123/568 |
| 3,733,827 | 5/1973 | Suzuki ...................................... 60/278 |
| 3,804,112 | 4/1974 | Harner . |
| 4,087,966 | 5/1978 | Akado et al. ............................. 60/278 |
| 4,370,560 | 1/1983 | Faulkner et al. . |
| 4,822,692 | 4/1989 | Koehler . |
| 4,828,930 | 5/1989 | Koehler . |
| 4,853,013 | 8/1989 | Rio et al. . |
| 4,924,668 | 5/1990 | Panten et al. . |
| 4,930,565 | 6/1990 | Hackman et al. . |
| 4,977,951 | 12/1990 | Hackman . |
| 5,149,360 | 9/1992 | Koehler et al. . |
| 5,174,729 | 12/1992 | Waters et al. . |
| 5,213,151 | 5/1993 | Hackman . |
| 5,313,778 | 5/1994 | Sweet et al. . |
| 5,313,779 | 5/1994 | Rodgers . |
| 5,385,012 | 1/1995 | Rowe . |

FOREIGN PATENT DOCUMENTS

| | | |
|---|---|---|
| 101733 | 1/1973 | Germany . |
| 2713290 | 5/1978 | Germany . |
| WO9608302 | 3/1996 | WIPO . |

*Primary Examiner*—David A. Simmons
*Assistant Examiner*—Minh-Chau T. Pham
*Attorney, Agent, or Firm*—Leydig, Voit & Mayer, Ltd.

[57] ABSTRACT

A filter assembly for removing soot from gas from an engine includes a housing and a filter disposed in the housing. The housing includes a housing body and a cover disposed on the housing body. The housing body has an inlet connection to a gas line of an engine and an outlet. The cover is removable from the housing body without breaking fluid lines to the inlet or the outlet. In one embodiment, a soot filter for removing soot particles from bleed gas from a engine includes a sintered fiber metal medium having a voids volume of about 50% to about 95% and including metal fibers having a diameter about 20 microns to about 100 microns and a nominal length of at least about 100 microns, the sintered fiber metal medium having an upstream surface communicating with bleed gas containing soot particles, a downstream surface communicating with filtered bleed gas, and a bore extending through the sintered fiber metal medium between the upstream surface and the downstream surface.

50 Claims, 4 Drawing Sheets

SOOT FILTER

This application is the U.S. National Phase of International Application No. PCT/US97/02181 filed Jan. 31, 1997, which claimed priority, including the benefit of the earlier filing date, of U.S. Application No. 60/001,032 filed Feb. 2, 1996.

BACKGROUND OF THE INVENTION

1. Field of the Invention

This invention relates to a soot filter capable of removing soot from a gas, such as engine bleed air. More particularly, it relates to a filter capable of removing soot from bleed air from an aircraft engine, such as an auxiliary power unit.

2. Description of the Related Art

Modern aircraft are frequently equipped with an auxiliary engine referred to as an auxiliary power unit (APU). This is a small, on-board engine usually located in the aft section of an aircraft and used to power aircraft systems when the main engines of the aircraft are shut down. An auxiliary power unit can be used for various purposes, such as providing heat, electricity, air conditioning, and compressed air, but in contrast to a main aircraft engine, it is not capable of providing in-flight thrust. Compressed bleed air from the auxiliary power unit can also be provided to an air turbine starter system in order to start a main engine of the aircraft.

An auxiliary power unit is commonly a gas turbine, and like other types of gas turbines, it is susceptible to surging if the rate of air intake is improper for the engine operating conditions. Therefore, an auxiliary power unit is frequently equipped with a surge control valve which is fluidly connected to the auxiliary power unit and which is opened and closed based on operating conditions within the auxiliary power unit so as to prevent surging.

A surge control valve for an auxiliary power unit usually receives bleed air from the auxiliary power unit and performs control based on some characteristic (such as the pressure) of the bleed air. A surge control valve may include various pneumatic components, such as pressure regulators and pneumatically-operated valves, through which the bleed air from the auxiliary power unit passes. The bleed air frequently contains fine, tarry soot particles, i.e., unburned or incompletely burned hydrocarbons which are ingested by the auxiliary power unit from a variety of sources, such as from the diesel engines of ground service vehicles which service the aircraft when it is parked at a gate at an airport, from the exhaust of the engines of nearby aircraft, or from dust which is vacuumed up from the runway by the operation of the auxiliary power unit. The soot is extremely sticky, and if allowed to enter the surge control valve, the soot can cause the surge control valve to stick and malfunction. Other aircraft equipment which employs the bleed air from an auxiliary power unit may also contain components which are extremely sensitive to the presence of dirt, oil, and particularly hydrocarbon particles and which can be seriously damaged if they ingest soot particles with the bleed air. Accordingly, there is a need for a filter which can effectively remove soot from bleed air from an auxiliary power unit. The bleed air from the main engines of an aircraft may also contain soot, and since this bleed air may also be supplied to other aircraft equipment, there is a need for a filter which can effectively remove this soot as well.

Although filters exist which are capable of removing soot from a gas, existing filters are often impractical for use with aircraft engines because of various drawbacks, such as high costs, bulkiness, and insufficient dirt capacity, which necessitates their being frequently cleaned or replaced. Furthermore, because the bleed air for an auxiliary power unit typically has a very low flow rate, inertial separators are unable to effectively remove particles from the bleed air.

SUMMARY OF THE INVENTION

The present invention provides a soot filter suitable for removal of soot from gas from an engine or other source of a soot-containing gas, and particularly from bleed air from a gas turbine such as an auxiliary power unit for an aircraft.

The present invention also provides a soot filter which is extremely compact yet has a high dirt capacity.

The present invention further provides a soot filter which can effectively remove soot particles from gas at very low flow rates.

The present invention additionally provides a soot filter having a filter element which is sufficiently economical that the filter element can be discarded when it becomes clogged.

The present invention yet further provides a filter assembly including a soot filter capable of being installed and replaced without disconnecting any fluid lines to the filter assembly.

The present invention additionally provides an arrangement including a source of a particle-containing gas, such as a gas turbine engine, and a soot filter for removing particles from the gas.

The present invention also provides a method of removing soot from a gas.

According to one aspect of the present invention, a soot filter includes a sintered metal filter medium having an upstream surface communicating with gas containing soot particles and a downstream surface communicating with filtered gas. A bore extends through the sintered metal filter medium between the upstream and downstream surfaces. The sintered metal medium has good corrosion resistance at high temperatures and an extremely high dirt capacity, so it has a long useful life. It can also have a low material cost so that it can be discarded when replacement is required.

The sintered metal medium is not restricted to any particular type, but preferably it is selected such that the filter is capable of removing soot particles having a size of 1–5 $\mu$m from gas from an engine. In a preferred embodiment, the sintered metal medium comprises a fiber metal medium. A portion of the fibers in the medium may have a nonlinear shape. The fibers preferably have a diameter in the range from about 1 to about 150 $\mu$m and a nominal length in the range from about 100 $\mu$m to about 20 mm. The fibers are preferably mechanically interlocked and sinter bonded to one another, defining voids between the fibers of the mass. The fiber metal medium preferably has a voids volume in the range from about 50 percent to about 95 percent. For fibers having a diameter greater than roughly 40 $\mu$m, fibers formed by the melt overflow casting process are particularly suitable for use in the fiber metal medium. The filter may also include a porous prefilter on an upstream side of the sintered metal medium. The filter may be disposed in a housing which can fluidly connect the filter to a source of a particle-containing gas to be filtered.

The filter can have a very high voids volume, resulting in a low pressure loss and a long life span. At the same time, the filter can capture very small soot particles of 1–5 $\mu$m with a high efficiency at flow rates which are too low for inertial separators to function effectively. Additionally, the filter can be light weight and very compact, making it highly suitable for use in an aircraft environment.

According to another aspect of the present invention, a filter assembly includes a housing and a disk-shaped filter. In a preferred embodiment, the housing includes first and second sections in the form of a body and a cover which is mounted on the body to enclose the filter and which can be opened and closed to permit installation and removal of the filter from the body without disconnecting fluid lines from the body. The filter is disposed in the housing along a fluid path between the inlet and the outlet.

According to yet another aspect of the present invention, an arrangement includes a source of gas containing soot particles, such as a gas turbine engine, and a filter in fluid communication with the source of gas and including a sintered metal medium. In a preferred embodiment, the source of gas is an engine having a bleed gas outlet, and the sintered metal medium comprises a fiber metal medium containing metal fibers formed by melt overflow casting.

According to a further aspect of the present invention, a filtering method includes passing a soot-containing gas from a gas turbine engine through a filter including a sintered metal medium. In preferred embodiments, the sintered metal medium comprises a fiber metal medium having a voids volume of about 50 to about 95%.

A filter according to the present invention can be used to filter particle-containing gases from a wide variety of sources, and while it is particularly suited for use in filtering bleed air from a gas turbine, it is not restricted to use with engines. When the filter is installed on an aircraft, a few examples of possible uses are to filter bleed air from an auxiliary power unit or a main aircraft engine, back pressure air used to keep oil seals closed, exhaust gases, air supplied to air foil bearings used in air cycle machines, and cooling air for electronic and avionic equipment. An example of an application unrelated to aircraft is as a filter for protecting pneumatic controls for ground-based gas turbine engines for power generation.

A filter according to the present invention is particularly useful in removing soot, i.e., unburned or incompletely burned hydrocarbons from gases. However, it is not limited to use with soot and can be used to filter a gas to remove any type of particles having a size falling within the removal rating of the filter.

DESCRIPTION OF PREFERRED EMBODIMENTS

Figure 1:
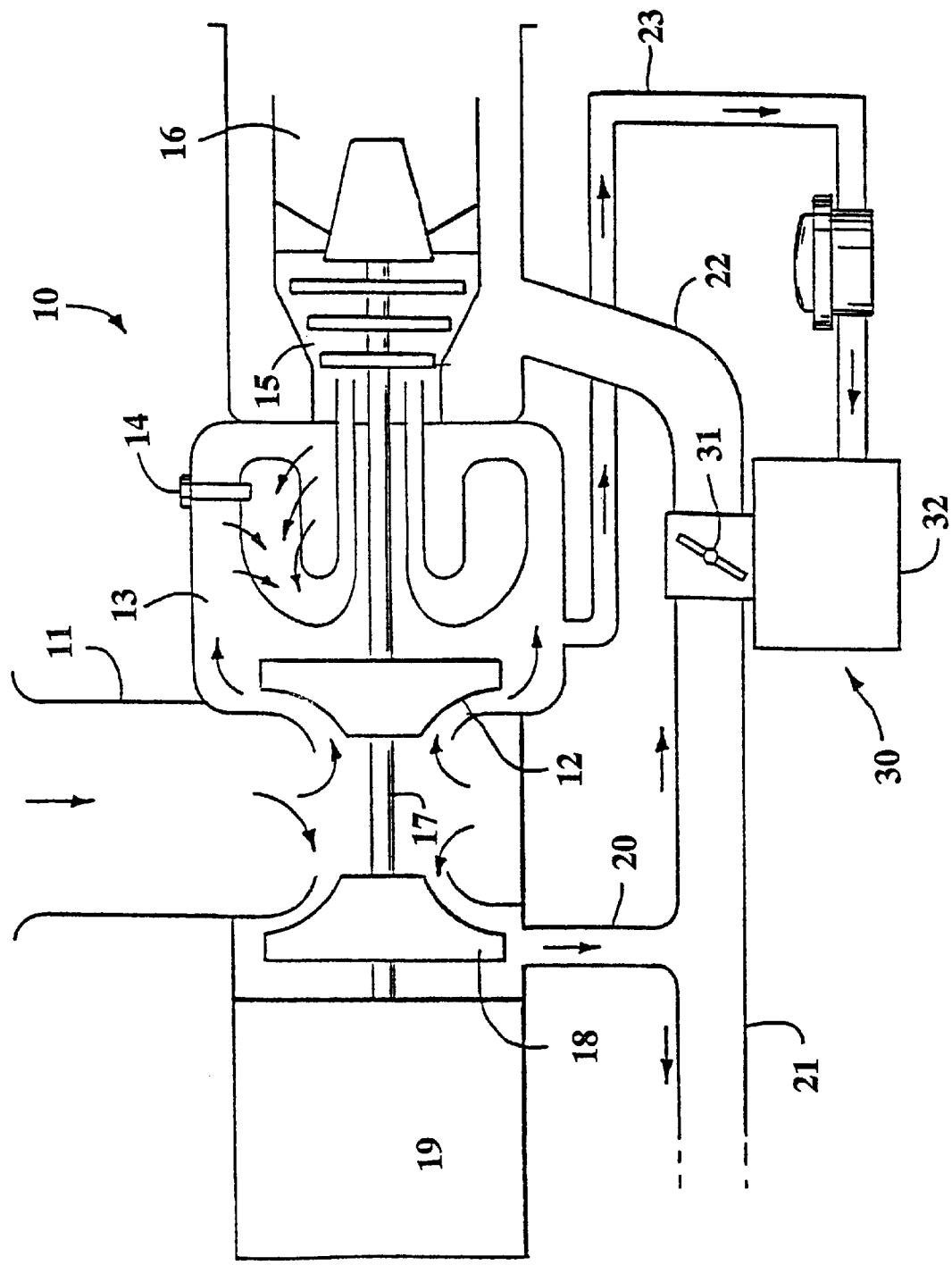
FIG. 1 is a schematic illustration of an auxiliary power unit equipped with a filter assembly according to the present invention.

FIG. 1 schematically illustrates a typical auxiliary power unit 10 for an aircraft with which a filter assembly according to the present invention can be employed. The auxiliary power unit 10 can have any desired structure and may be a commercially available model, for example. In the present embodiment, the auxiliary power unit 10 includes an air intake 11 through which air enters to be compressed by a centrifugal-type power section compressor 12 having one or more stages. The compressed air from the power section compressor 12 is fed to one or more combustion chambers 13, where it is mixed with fuel supplied by fuel nozzles 14 and combusted. The combusted air is supplied to a turbine 15, which may have one or more stages, and the rotor(s) of the turbine 15 are rotated by the combusted air. The rotation of the turbine rotor(s) rotates an output shaft 17 connected to the turbine 15, which in turn drives the power section compressor 12, a centrifugal-type load compressor 18, and a gearbox 19. The load compressor 18 compresses air from the air intake 11 and supplies the compressed air through bleed air lines 20 and 21 to various pneumatic systems of the aircraft. The gearbox 19, which typically comprises a reduction gear, may be connected to various unillustrated pieces of equipment, such as an electrical generator which provides electrical power for the aircraft, a compressor, or other equipment so as to drive the equipment at a suitable rotational speed.

The auxiliary power unit 10 is equipped with a surge control valve 30 for preventing the occurrence of surging. The surge control valve 30, which may be of conventional or any other suitable design, includes an adjustable valve plate 31 pivotably installed in a bypass 22 connected between bleed air line 20 from the load compressor 18 and the exhaust region 16 of the auxiliary power unit 10. The surge control valve 30 also includes a pneumatic control unit 32 which opens and closes the valve plate 31 on the basis of the pressure of bleed air in a bleed air line 23 connected to the discharge side of the power section compressor 12. A filter assembly 40 according to the present invention is installed in bleed air line 23 between the auxiliary power unit 10 and the pneumatic control unit 32 so that bleed air passes through the filter assembly 40 and is filtered before entering the pneumatic control unit 32. The pneumatic control unit 32 typically includes components such as a pressure regulator and pneumatic actuators for actuating the valve plate 31.

Auxiliary power units and surge control valves with which a filter according to the present invention can be employed are commercially available from a number of manufacturers, such as Pratt and Whitney or Allied Signal Engines. However, the present invention is not limited to use with equipment from these manufacturers or with any particular models or designs. In addition, FIG. 1 shows just one possible surge control arrangement, and many other arrangements, well known to those skilled in the art, can be employed. As the principles and details of operation of surge control valves are well known to those skilled in the art, a description thereof will be omitted.

Figure 2:
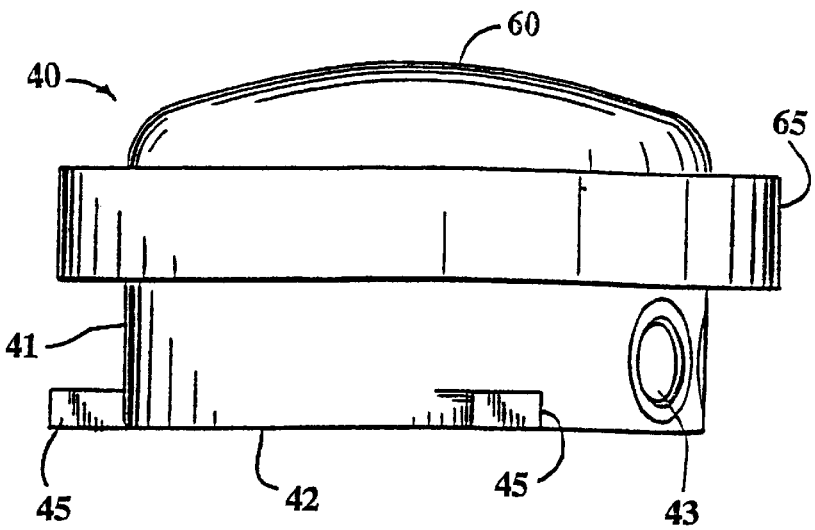
FIG. 2 is an elevation of the filter assembly of FIG. 1.
Figure 3:
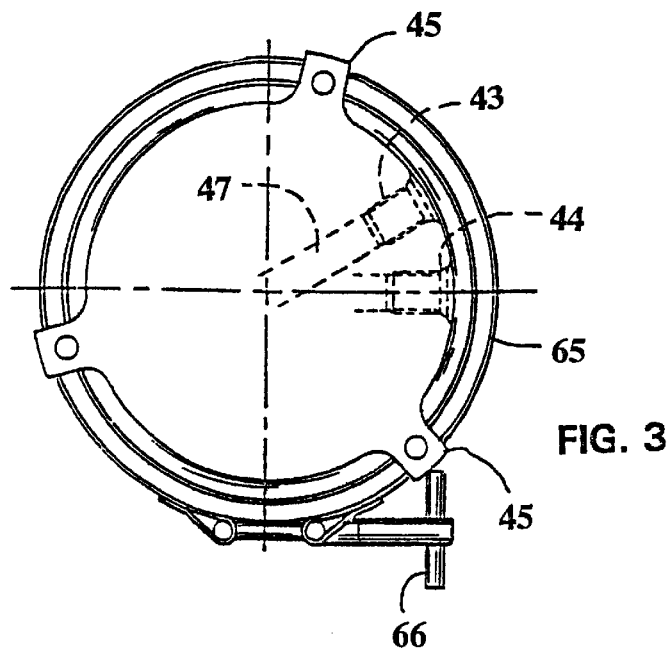
FIG. 3 is a bottom view of the filter assembly of FIG. 2.

FIGS. 2 through 6 illustrate the filter assembly 40 of FIG. 1 in greater detail. As shown in these figures, it includes a housing 41 and a filter 70 disposed inside the housing 41. The housing 41 may have any structure which enables it to guide bleed air from bleed air line 23 through the filter 70 to be filtered. The housing 41 in this embodiment includes a body 42 and a cover 60 mounted on the body 42. The housing 41 also includes an inlet 43 for connection to a source of gas to be filtered, i.e., bleed air line 23, and an outlet 44 for gas which has been filtered by the filter 70. Preferably, the inlet 43 and the outlet 44 are both connected to or are part of the body 42, and the cover 60 is detachably mounted on the body 42 in a manner permitting the cover 60 to be opened and closed and the filter 70 to be installed and removed from the housing 41 without disturbing fluid connections to the inlet 43 and the outlet 44. In this embodiment, the inlet 43 is connected by one portion of bleed air line 23 to the auxiliary power unit 10 and the outlet 44 is connected by another portion of bleed air line 23 to the pneumatic control unit 32 of the surge control valve 30. As shown in FIG. 3, the inlet 43 and the outlet 44 both open onto the outer peripheral surface of the housing body 42, although they may open onto other portions of the body 42, such as the bottom surface, and they need not open onto the same surface as each other.

The filter assembly 40 may be installed in any convenient location along bleed air line 23, such as on a casing of the auxiliary power unit 10. In this embodiment, the body 42 is equipped with a plurality of feet 45 by means of which the body 42 can be bolted or otherwise secured to a suitable surface.

In FIG. 2, the housing 41 is illustrated with the cover 60 disposed higher than the body 42 of the housing 41. However, the filter assembly 40 can be operated in any desired attitude of the filter housing 41 with respect to the vertical, such as with the housing body 42 higher than the cover 60 or with both at the same height.

As a result of being compressed by the power section compressor 12, the bleed air from the auxiliary power unit 10 which is introduced into the surge control valve 30 through bleed air line 23 is usually extremely hot (for example, at temperatures from 350° to 500° F. at the inlet 43 of the housing 41). Therefore, when the filter assembly 40 is used with an auxiliary power unit 10, the housing 41 is preferably made of a high-temperature, corrosion resistant material, a few examples of suitable materials being stainless steel, titanium alloys, Hastelloy, and ceramics.

Figure 5:
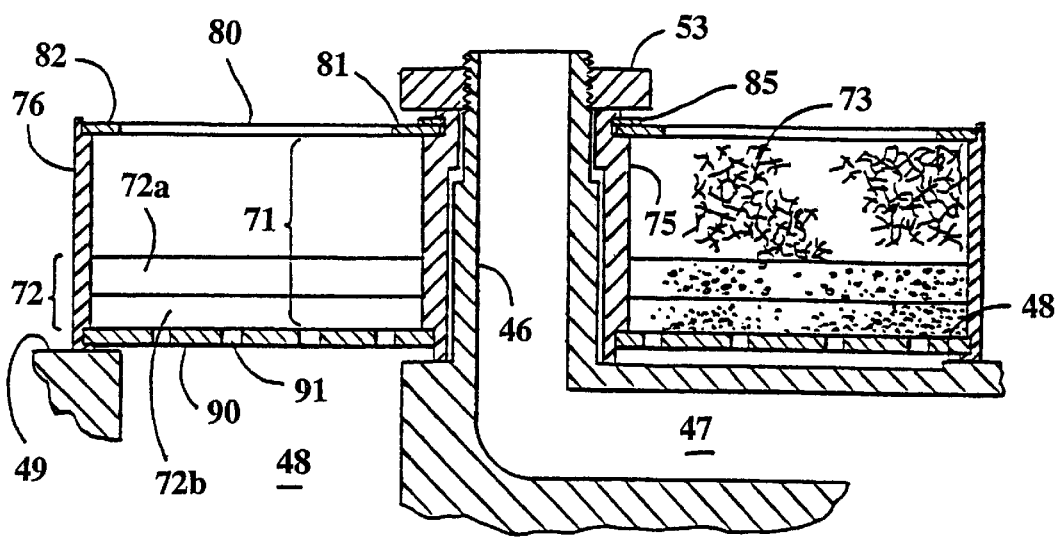
FIG. 5 is an enlarged vertical cross section of a portion of the filter assembly of FIG. 4.
Figure 6:
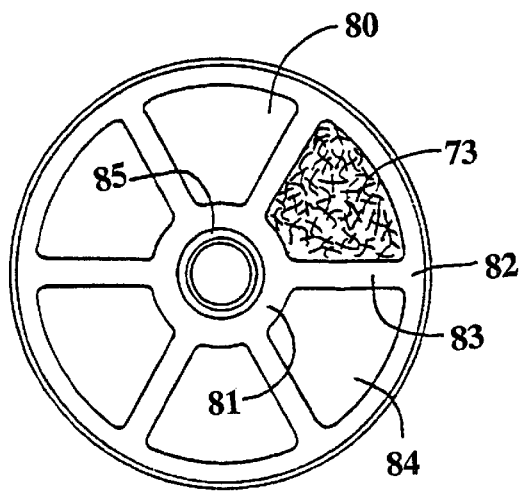
FIG. 6 is a top view of the filter shown in FIG. 4.

As shown in FIG. 5, the filter 70 in this embodiment is generally cylindrical and has a central bore extending through its height. The central bore of the filter 70 is convenient in reducing the size of the filter assembly 40, because it enables a conduit for gas to be filtered to pass through the center of the filter 70. However, the filter 70 is not restricted to any particular shape, and the bore may be omitted or placed in a different location. Some examples of other possible shapes of the filter 70 are that of a frustum of a cone, a rod, or a flat polygonal plate. The filter 70 may be of uniform or varying height over its radius.

The bore of the filter 70 surrounds a vertical feedpipe 46 disposed at the center of the housing body 42 and connected to the inlet 43 of the housing 41 by a radial conduit 47 formed in the body 42. As shown by arrows in FIG. 4, gas to be filtered enters the inlet 43 from bleed air line 23 and flows radially inwards through the conduit 47 and into the lower end of the vertical feedpipe 46. It then travels through the feedpipe 46 and is discharged from the upper end thereof, after which the gas flows axially through the filter 70, is filtered in the process, and then flows into a chamber 48 formed in the bottom portion of the housing body 42 beneath the filter 70 and communicating with the outlet 44. From the chamber 48, the filtered gas exits through the outlet 44 and is supplied to the pneumatic control unit 32 of the surge control valve 30. However, any flow path between the inlet 43 and outlet 44 which passes through the filter 70 may be employed. Furthermore, the functions of the inlet 43 and outlet 44 can be reversed, with gas to be filtered flowing into the outlet 44 and upward through the filter 70, and filtered gas leaving the housing 41 through the feedpipe 46, the radial conduit 47, and the inlet 43. If gas being filtered undergoes a large pressure drop as it passes through the filter 70, the direction of flow through the filter 70 is preferably such that an axial force on the filter 70 due to the pressure drop acts against the housing body 42 rather than in the direction of the cover 60 of the housing 41, because the housing body 42 can more readily be designed to resist the axial force, and the axial force can be applied directly to the surface on which the housing body 42 is mounted. Instead of gas flowing axially through the filter 70, it may flow radially or both axially and radially.

The housing body 42 and the cover 60 can be connected to each other in any desired manner, but preferably the cover 60 is detachably connected to the housing body 42 to permit the filter 70 to be readily installed and replaced. In the present embodiment, the two members 42 and 60 are connected by a conventional V-band clamp 65 equipped with a handle 66 which can be turned to tighten the clamp 65 around a flange 50 formed on the outer periphery of the housing body 42 and a flange 61 formed on the outer periphery of the cover 60. Each of the flanges 50 and 61 has a sloping outer surface, so that when the V-band clamp 65 is tightened, it urges the flanges towards each other and secures the cover 60 to the body 42. In the present embodiment, a sealing member such as an O-ring 51 of a heat-resistant material is disposed between the flanges 50 and 61 to form a seal between them. The housing 41 may but need not be hermetically sealed with respect to the atmosphere, since gas or particles leaking from the housing 41 poses no threat to the environment. A wide variety of other mechanisms can be used to detachably connect the cover 60 and the housing body 42, such as bolts, mating threads formed on the body 42 and the cover 60, a bayonet fitting, or a snap fit.

As shown in FIG. 5, which is a vertical cross section, the filter 70 of this embodiment includes a hollow, disc-shaped filter element 71 containing a filter medium and having a central bore, an inner ring 75 disposed in the central bore of the filter element 71, and an outer ring 76 surrounding the outer periphery of the filter element 71. The rings 75 and 76 provide smooth surfaces against which a seal can be formed between the filter 70 and the housing 41, give structural rigidity to the filter 70, and prevent damage to the filter element 71 during handling and installation of the filter 70. However, the rings 75 and 76 are not essential to the operation of the filter 70 and may be omitted if desired.

The inner ring 75 fits over the vertical feedpipe 46 of the housing body 42. In this embodiment, the inner ring 75 has an inner diameter which is greater at its lower end than at its upper end, and the vertical feedpipe 46 has an outer diameter which decreases from its lower end to its upper end, with the outer diameter of the lower end of the feedpipe 46 being larger than the inner diameter of the upper end of the inner ring 75. With this structure, the filter 70 can be mounted on the feedpipe 46 only in the manner shown in FIG. 5, thus ensuring a desired orientation of the filter 70 with respect to the flow of gas through the housing 41.

The flow rate of bleed gas from an auxiliary power unit is generally very low. An example of a typical flow condition at the inlet 43 of the filter assembly 40 is a clean air flow rate of about 0.5 to about 2.0 scfm (standard cubic feet per minute), a static pressure of 175 psi gauge, and a temperature of 500° F. The filter medium employed in the filter element 71 is therefore preferably made of a high-temperature, corrosion resistant material which is capable of effectively removing soot particles at very low flow rates and high temperatures. A sintered metal filter medium formed from a corrosion resistant metal is particularly suitable for use in the present invention for the removal of fine soot particles from hot gas at low flow rates, and such a filter medium 72 is employed in the present embodiment. An unsintered filter medium of a corrosion resistant material may also be used, but a sintered medium is often advantageous because it can withstand vibrations and flow surges without migration of the material forming the medium. The filter element 71 may also include a prefilter 73 on the upstream side of the sintered metal medium 72.

The removal rating of the filter element 71 as a whole can be selected based upon the type of particles which are to be removed from the bleed air passing through it. The majority of soot particles in an aircraft environment typically range in size from 2 to 5 $\mu$m. Therefore, when the filter assembly 40 is being used to remove soot particles from bleed gas from an auxiliary power unit, the filter element 71 is preferably able to remove soot particles of 2 $\mu$m and above, and more preferably of 1 $\mu$m and above. For soot particles in the range of 1–5 $\mu$m, the filter element 71 preferably has a capture efficiency of at least 95%. For soot particles of 5 $\mu$m in size, the capture efficiency is preferably at least 99% and more preferably at least 99.9%.

The voids volume of the sintered metal medium 72 is not limited to a particular value, but preferably it is in the range of about 50% to about 95%, more preferably it is within the range from about 75% to about 95%, and still more preferably in the range of about 85% to about 95%.

The prefilter 73 may perform a variety of functions. One function is to capture coarse particles in the gas passing through the filter element 71 and prevent the coarse particles from contacting and plugging up the sintered metal medium 72, thereby increasing the life span of the filter element 71. Another function which it is believed that the prefilter 73 performs is to agglomerate small soot particles into larger ones which can more readily be removed by the sintered metal medium 72. Soot particles in bleed air, because of their stickiness, readily adhere to surfaces which they contact. Individual soot particles in the bleed air, even though extremely small and generally much smaller than the voids in the prefilter 73, may nevertheless adhere to the prefilter 73 because of their stickiness. As additional soot particles contact and adhere to the particles already adhering to the prefilter 73, the individual particles agglomerate into a larger mass. When the mass of particles reaches a certain size, it will be dislodged from the prefilter 73 by the gas flow and carried downstream within the prefilter 73 to the sintered metal medium 72. Due to agglomeration in the prefilter 73, the average size of particles which reach the sintered metal medium 72 is significantly larger than in the absence of the prefilter 73, making it easier for the sintered metal medium 72 to capture the soot particles and permitting an increase in the pore size of the sintered metal medium 72. This results in a lower pressure drop and a longer useful life for the sintered metal medium 72.

The prefilter 73 is preferably significantly more porous than the sintered metal medium 72. For example, it may have a voids volume of at least 90% and more preferably at least 95%. Particularly good results have been obtained using a prefilter with a voids volume between 98.0% and 99.0%. An example of a suitable prefilter is a knit mesh pad of a corrosion resistant metal wire or a pad of a nonwoven corrosion resistant metal fabric, stainless steel being a particularly suitable metal for use in forming the pad. Such pads are commercially available in a range of porosities. At an air flow rate of about 0.5 to about 2.0 scfm through the filter, a knit mesh pad formed of stainless steel fibers having a fiber diameter of approximately 0.004 to approximately 0.006 inches and a density in the range of approximately 1.5 to approximately 2.5 grams per cubic inch has been found to provide good results. Examples of other members which can be used as a prefilter include wire mesh, expanded metal, photoetched screens, wire wrapped or formed structures, and perforated sheets.

The prefilter 73 can be made of any material capable of withstanding the high temperatures encountered during the operation of the filter assembly 40, such as stainless steel, copper, nickel, brass, and ceramics, to name a few examples. When operating temperatures permit, fibers of high temperature polymers such as PPS (polyphenylene sulfide) or Nomex (a trademark of Du Pont for an aramid fiber) can also be used.

The sintered metal medium 72 and the prefilter 73 need not have any particular shape. They may be similar to or different in shape from the filter element 71 as a whole. In this embodiment, each comprises a hollow disc of substantially uniform thickness over its diameter with top and bottom sides which are flat. Both the sintered metal medium 72 and the prefilter 73 may be corrugated to increase their surface area, but in this embodiment, they are uncorrugated.

The removal rating of the sintered metal medium 72 may be constant or vary over its depth. A filter medium having a removal rating which varies over its depth, with the downstream portions of the medium having a finer pore size than the upstream portions of the medium, frequently has a higher dirt capacity than a filter medium having a constant removal rating over its depth. The removal rating of the sintered metal medium 72 can be varied in a variety of manners. For example, the sintered metal medium 72 may comprise a single layer having a pore size which varies over its depth, or it may comprise a plurality of separately formed layers having different pore sizes. The different layers may but need not be secured to one another. In the illustrated embodiment, the sintered metal medium 72 comprises a first or upstream hollow disk-shaped layer 72a and a second or downstream hollow disk-shaped layer 72b disposed on a downstream side of the first layer 72a and having a finer average pore size than the first layer 72a. Each of layers 72a and 72b is a separate, unitary sintered body. In the illustrated embodiment, the layers 72a and 72b are stacked on each other without being joined together.

The filter element 71 may contain components other than those shown in the figures. For example, it may include various layers to provide for flow distribution, coarser prefiltration, or mechanical support.

The prefilter 73 may but need not be physically joined to the sintered metal medium 72. For example, the prefilter 73 may simply rest atop or be pressed against the upstream surface of the sintered metal medium 72, or it may be spaced from the sintered metal medium 72 by an intermediate member, such as a porous mesh or a perforated plate, although for compactness, the prefilter 73 and the sintered metal medium 72 will generally be contacting each other.

Preferably, the sintered metal medium 72 is sealed to the outer periphery of the inner ring 75 and the inner periphery of the outer ring 76 so that particles large enough to be captured by the sintered metal medium 72 cannot bypass the sintered metal medium 72 by flowing between the sintered metal medium 72 and the rings. A seal may be formed in any suitable manner. For example, the sintered metal medium 72 may be sintered or welded directly to the rings 75 and 76, or a heat resistant material such as a filler metal suitable for brazing or welding can be disposed between the sintered metal medium 72 and the rings, or the sintered metal medium 72 can be pressed into sealing contact with the rings 75, 76 by a shrink fit or a press fit. In the present embodiment, the sintered metal medium 72 is press fit between the rings 75, 76 to create a metal-to-metal seal.

An upper retainer 80 having openings through which gas to be filtered can pass may be disposed on the upstream side of the filter 70 adjacent the prefilter 73 to hold the prefilter 73 in place atop the sintered metal medium 72. As shown in FIG. 5 and in FIG. 6, which is a top view of the filter 70, the upper retainer 80 in this embodiment includes a hollow hub 81 which fits over the upper end of the inner ring 75, an outer rim 82 which engages the outer ring 76, and a plurality of spokes 83 extending between the hub 81 and the rim 82. Gas to be filtered can pass through the spaces 84 between adjoining spokes 83. The hub 81 of the upper retainer 80 is held in place in a circumferential groove formed in the inner ring 75 by a suitable retaining member, such as a spiral retaining ring 85. The filter 70 may also include a lower retainer 90 disposed adjacent the downstream surface of the sintered metal medium 72 for supporting the filter element 71 from below. The lower retainer 90 in this embodiment comprises a disk-shaped metal plate having a central hole with an inner periphery which is press fit onto the lower end of the inner ring 75 and an outer periphery which snaps into a circumferential groove formed in the outer ring 76. Perforations 91 are formed in the retainer 90 for the passage of filtered gas. The lower retainer 90 gives structural support to the sintered metal medium 72 and protects it from damage during handling of the filter 70. Preferably, the perforations 91 are sufficiently large that the lower retainer 90 does not produce any significant pressure drop in gas flowing through the filter 70 during normal operation.

Figure 4:
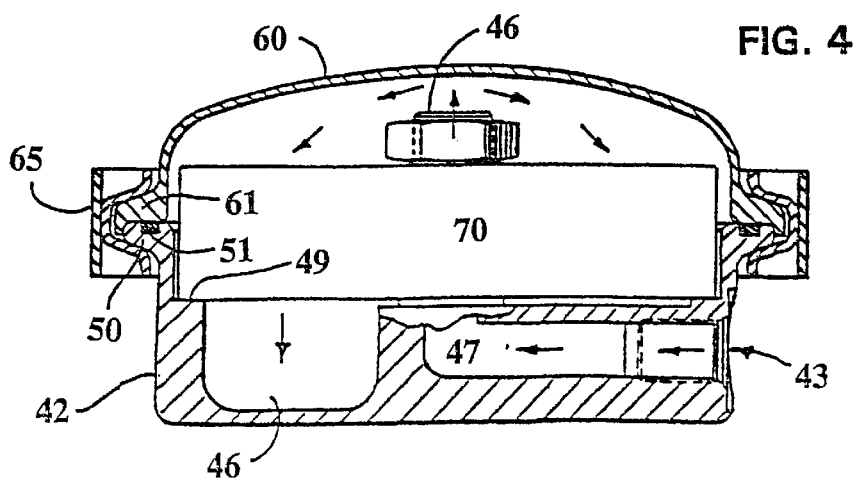
FIG. 4 is a vertical cross section of the filter assembly of FIG. 2.

Preferably, a seal is formed between the filter 70 and the housing 41 to prevent particles large enough to be captured by the filter element 71 from bypassing the filter 70 either along its inner or its outer periphery. Any sealing arrangement capable of withstanding the temperatures of the hot gas being filtered can be employed. In the present embodiment, as shown in FIGS. 4 and 5, the outer ring 76 sits on a circumferentially extending ledge 49 formed around the periphery of the housing body 42, and the lower end of the outer ring 76 is pressed downwards into sealing contact with the upper surface of the ledge 49 by a nut 53 which is screwed onto threads formed on the upper end of the vertical feedpipe 46. Before the nut 53 is tightened, with the outer ring 76 seated on the ledge 49, there is preferably a small clearance between the lower end of the inner ring 75 and the portion of the housing body 42 surrounding the base of the feedpipe 46. When the nut 53 is tightened, it presses the inner ring 75 downwards to form a metal-to-metal seal between the lower end of the inner ring 75 and the portion of the housing body 42 surrounding the feedpipe 46 to prevent unfiltered gas from bypassing the filter 70 by flowing between the inner periphery of the inner ring 75 and the outer periphery of the feedpipe 46. Other possible sealing arrangements include a metal-to-metal seal between the nut 53 and the upper end of the feedpipe 46, or sealing members such as sealing rings placed between the outer ring 76 and the housing body 42 and/or between the vertical feedpipe 46 and the inner ring 75.

Figure 7:
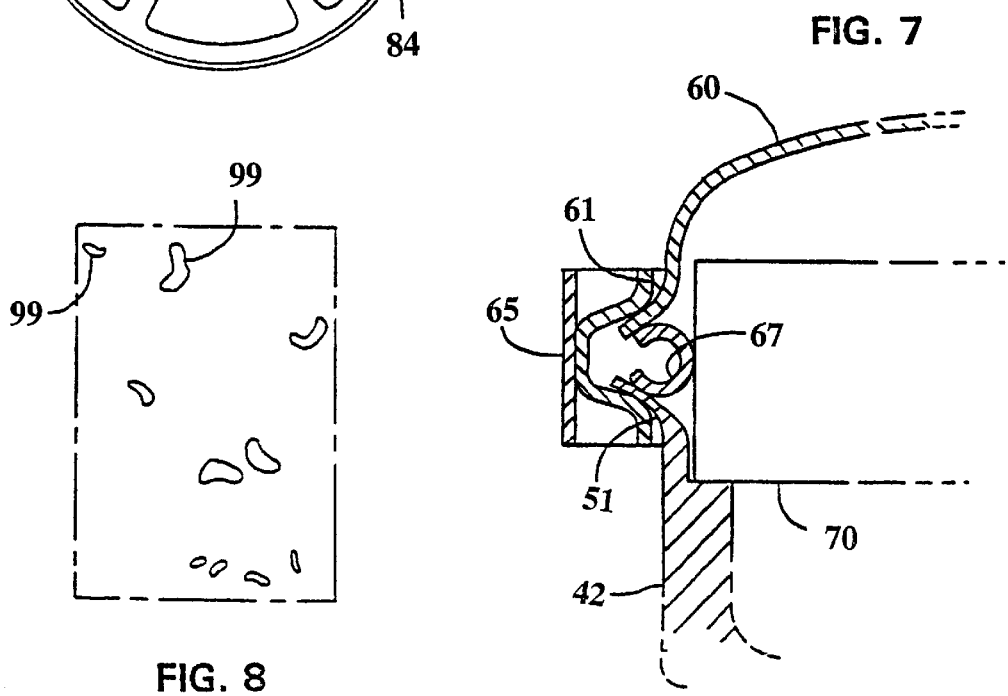
FIG. 7 is a vertical cross section showing an alternate sealing arrangement which can be used with the filter assembly of FIG. 1.

FIG. 7 illustrates an alternative sealing arrangement in which a seal is formed around the outer periphery of the filter 70 by a sealing ring 67 disposed in the space between a sloping flange 50 of the housing body 42 and a sloping flange 61 of the cover 60 along the entire outer periphery of the outer ring 76 of the filter 70. When the V-band clamp 65 surrounding the flanges 50 and 61 is tightened, the sealing ring 67 is pressed into sealing contact with the outer ring 76 of the filter 70 and with the inner surfaces of both sloping flanges 50 and 61. The sealing ring 67 may be a conventional sealing ring (a C-ring, O-ring, etc.) of a material suitable for high-temperature applications. With this arrangement, a single sealing ring 67 serves not only to prevent gas from flowing between the filter 70 and the housing 41, but it also seals the housing 41 with respect to the exterior. In this case, it is not necessary for the outer ring 76 of the filter 70 to be pressed into sealing contact with the ledge 49 of the housing body 42 since a seal is achieved by the sealing ring 67, so the stresses acting on the filter 70 can be reduced.

Figure 9:
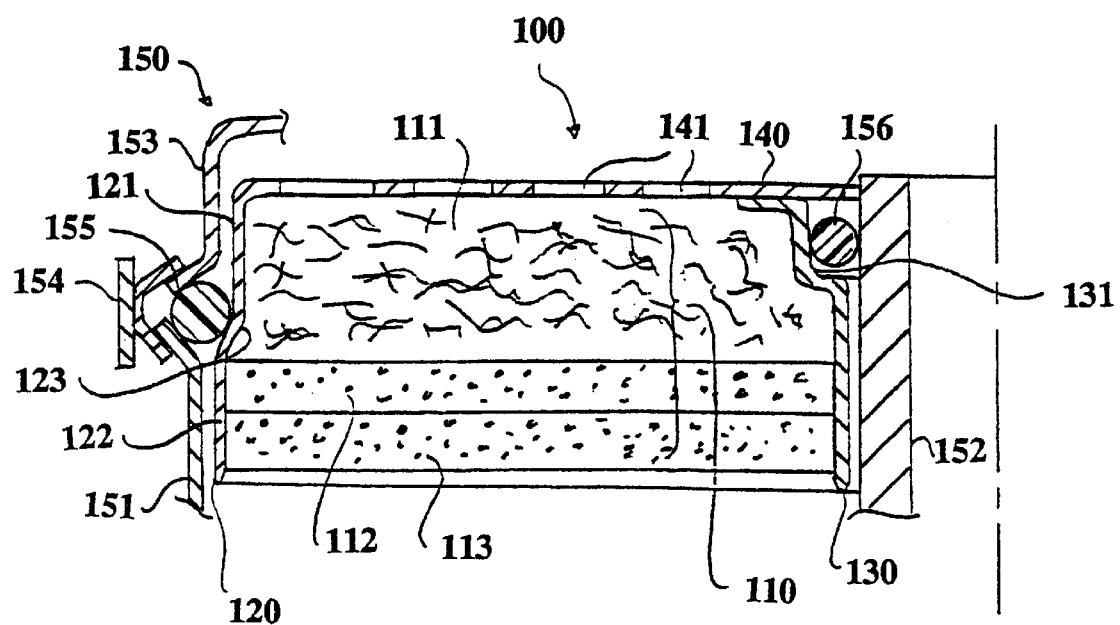
FIG. 9 is a vertical cross section of another embodiment of a filter assembly according to the present invention.

FIG. 9 is a vertical cross section of a portion of another embodiment of a filter assembly according to the present invention. This assembly includes a filter 100 having a ring-shaped filter element 110 similar to the filter element 71 of the embodiment of FIG. 5. The filter element 110 includes a porous prefilter 111 and one or more hollow disk-shaped layers 112, 113 of a sintered metal medium. The filter element 110 is supported by a casing of a suitable material, such as metal, able to withstand the temperatures at which the filter 100 is to be operated. The casing includes an outer ring 120 surrounding the outer periphery of the filter element 110 and an inner ring 130 surrounded by the hollow center of the filter element 110. The casing also includes a ring-shaped plate 140 secured to the rings 120, 130 atop the prefilter 111. The plate 140 has a central hole coaxial with the bore of the inner ring 130 and openings 141 for the passage of gas to be filtered. The openings 141 may be of any shape which enables gas to pass through the plate 140, preferably with as little pressure drop as possible, while allowing the plate 140 to retain the prefilter 111 atop the sintered layers 112, 113. The plate 140 may be formed separately from the rings 120, 130, or as shown in FIG. 9, it can be formed integrally with one of the rings, such as the outer ring 120, and be secured to the other ring, such as the inner ring 130, in a suitable manner, such as by spot welding. The sintered layers 112, 113, which may be similar to the sintered layers 72a, 72b of FIG. 5, may be sealed to the inner and outer rings 120, 130 in any suitable manner, such as be press fitting of the layers 112, 113 between the rings 120, 130. If desired, a retainer for supporting the sintered layers 112, 113 from below, like the retainer 90 of FIG. 5, may be provided. The illustrated casing is very economical to manufacture since it does not require machining, and the components of the casing can be shaped by processes suitable for mass production.

The filter 100 is disposed in a housing 150 having a body 151 and a cover 153 detachably mounted on the body 151. The body 151 and the cover 153 may be similar in structure to the body 42 and cover 60 of the embodiment of FIG. 4. The body 151 includes a central feedpipe 152, corresponding to the feedpipe 46 of FIG. 5, which extends through the center of the filter 100 and through which gas to be filtered can be introduced to the region within the housing 150 on the upstream side of the filter 100. The body 151 and the cover 153 may be detachably secured to each other by a V-band clamp 154, for example, and are preferably sealed to each other and to the outer ring 120 of the filter 100 by a single sealing member such as an O-ring 155 in a manner similar to that shown in FIG. 7. The inner ring 130 is sealed to the feedpipe 152 by another sealing member, such as an O-ring 156, mounted on the inner ring 130 and surrounding the feedpipe 152. This O-ring 156 is disposed inside a circular slot defined by an indentation 131 formed in the inner surface of the inner ring 130 around its inner periphery, and by the lower surface of the plate 140, which bounds the O-ring 156 from above. As shown in the figure, the lower surfaces of the inner and outer rings 120 and 130 may be spaced from the body 151 of the housing 150, and a seal between the filter 100 and the housing 150 may be accomplished entirely by the O-rings 155 and 156. This arrangement results in lower stresses on the filter 100 than if the filter 100 were sealed against the housing 150 by pressing the rings 120 and 130 directly against the housing 150 as in the embodiment of FIG. 4.

The outer ring 120 is formed with an outer diameter which increases from its upper end to its lower end. Namely, it has a cylindrical small diameter portion 121 at its upper end and a cylindrical large diameter portion 122 at its lower end. The outer diameter of the small diameter portion 121 is small enough for the cover 153 to fit over the small diameter portion 121, but the outer diameter of the large diameter portion 122 is larger than the inner diameter of the portion of the cover 153 which fits over the filter 100. In this manner, the cover 153 cannot be sealed to the body 151 atop the filter 100 unless the filter 100 is oriented with the small diameter portion 121 of the outer ring 120 extending into the cover 153 and the large diameter portion 122 of the outer ring 120 extending into the body 151 of the housing 150. In other words, the cover 153 can be sealed to the body 151 atop the filter 100 only if the filter 100 is oriented such that the prefilter 111 is on the upstream side of the sintered layers 112, 113. This arrangement prevents a user from installing the filter 100 upside down in the housing 150. The outer ring 120 may have a sloping surface 123 connecting the small diameter portion 121 and the large diameter portion 122 against which the outer O-ring 155 can seal.

Various types of sintered materials can be employed as the sintered metal medium. Some examples of suitable materials are powder metal media, fiber metal media, sintered metal meshes, and hybrids of the above media, such as supported porous media having metal particulates supported by and sintered to a metal mesh or other foraminate support. More specific examples of such sintered metal media are those available from Pall Corporation under the trade designations PSS (a sintered stainless steel powder metal medium), PMM (a porous sintered metal membrane including metal particles sintered to a foraminate support), PMF (a porous sintered fiber metal medium), Rigimesh (a sintered woven wire mesh medium), Supramesh (stainless steel powder sintered to a Rigimesh support), PMF II (a porous sintered fiber metal medium), and combinations of more than one of these materials. A sintered metal medium for use in the present invention may be formed from any of a variety of metal materials including alloys of various metals such as nickel, chromium, copper, molybdenum, tungsten, zinc, tin, gold, silver, platinum, aluminum, cobalt, iron, and magnesium, as well as combinations of metals and metal alloys, including boron-containing alloys. Brass, bronze, and nickel/chromium alloys, such as stainless steels, the Hastelloys, the Monels and the Inconels, as well as a 50 weight percent nickel/50 weight percent chromium alloy, may also be used.

The term "sintered fiber metal medium" refers to a medium formed by sintering a mass of randomly arranged metal particulates at least a portion of which are metal fibers. In addition to fibers, the particulates may include nonfibers, such as metal powder formed by any desired process. The term "fibers", as used herein, is intended to describe elongated metallic bodies having longitudinal dimensions, i.e., nominal lengths, which are greater than the diameters of the bodies. The nominal length, in the case of a fiber which is bent or nonlinear is the length the fiber would have if straightened. That is, the measurement of nominal length follows and includes the bends of a nonlinear fiber.

The term "diameter" is intended to refer to the average cross-sectional dimension of the body across a narrow dimension, regardless of the cross-sectional shape of the body. Thus, the cross-sectional shape of the fibers may be circular, oval, rectangular, ribbon-shaped, quasi cruciform, elliptical, dendritic, acicular, or any other regular or irregular shape. The metal powder in the metal particulates, if present, may include particles of any regular or irregular shape. For example, the metal powder may include generally spheroidal particles.

Metal fibers in a fiber metal medium for use in the present invention may have a variety of shapes, including linear or straight. For example, in one form of the present invention, the metal particulates in a fiber metal medium may include at least about 10% and more preferably from about 30% to about 100% nonlinear metal fibers. Nonlinearity may be imparted to the fibers by substantially working linear fibers in a hammermill or other device which randomly bends the fibers by the application of mechanical energy. The resulting nonlinear fibers have a "kinky" appearance, characterized by at least one change in direction and more often by a plurality of random directional changes which give the fibers a curved, twisted, hooked, corkscrew, crimped, or otherwise bent or undulated appearance. The worked fibers are also more uniform in nominal length.

The fibers in a fiber metal medium for use in the present invention can be formed by any known methods for manufacturing metal fibers or wires, and the fiber metal medium may contain a mixture of fibers formed by different methods. For small-diameter fibers up to approximately 40 μm in diameter, bundle drawn fibers and steel wool fibers cut to a suitable length are examples of suitable fiber types. For fibers having a diameter of greater than approximately 40 μm, fibers formed by the melt overflow casting method are particularly suitable because of their low costs compared to fibers of comparable diameter formed by other methods. The melt overflow casting process for forming metal fibers is described, for example, in U.S. Pat. Nos. 5,213,151, 4,977,951, 4,930,565, and Re. 33,327. In this process, a container of molten metal is positioned adjacent a rotating wheel or drum. Molten metal flows over the edge of the container and onto the rotating wheel where it is solidified to form metal fibers, which are removed from the wheel in a suitable manner for collection. For example, the momentum imparted to the fibers by the rotation of the wheel may be used to project the fibers from the wheel onto a recovery surface.

If it is desired to impart nonlinearity to the cast fibers, they can be worked until they have a desired size and shape in a device such as a G5HFS hammermill manufactured by Prater Industrial Products, Inc. According to one form of the present invention, the fibers may be hammermilled until at least about 40% of the fibers each have a plurality of bends.

Figure 8:
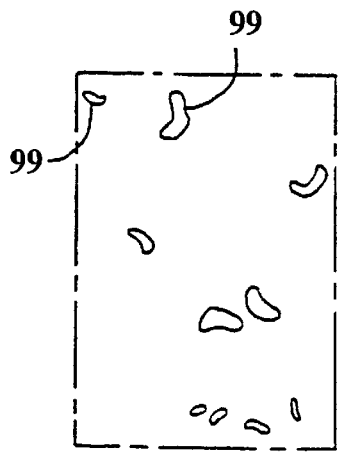
FIG. 8 is a schematic view of the cross section of metal fibers employed in the sintered metal medium of the filter assembly of FIG. 1.

Fibers produced by the melt overflow casting process and then worked in a hammermill are not only bent and kinky, but they frequently also have a generally crescent shape in cross section, as shown in FIG. 8. The cross sections of the crescent-shaped fibers 99 may have tapered tips, giving the cross section the appearance of a "quarter moon". The thickness of the fiber cross section may be either uniform or tapered along the edges. The arc defining the crescent is generally no greater than about π radians (180°). Preferably, the arc is from about π/2 to about π radians.

When a sintered metal medium for use in the present invention is a fiber metal medium, the metal fibers, regardless of the method by which they are formed, are preferably rather coarse, e.g., the diameter is preferably in the range from about 1 to about 150 μm, more preferably about 10 to about 125 μm, and still more preferably about 20 to about 100 μm. The nominal length of the metal fibers preferably ranges from about 100 μm to about 20 mm, and more preferably from about 2 mm to about 8 mm. Generally, the aspect ratio (nominal length divided by diameter) for at least 50% of the fibers is preferably from about 3 to about 700 and preferably from about 150 to about 700. The sintered fiber metal medium preferably has relatively large nominal geometric pore sizes, ranging from about 25 to about 750 μm and more preferably from about 50 to about 200 μm.

A sintered fiber metal medium for use in the present invention can be formed using a variety of processes which can broadly be characterized as either "wet" or "dry". In wet processes, metal particulates containing fibers are suspended in a liquid medium and then formed into a structure which is then sintered to form the sintered metal medium. In dry processes, no liquid medium is used, the structure being formed by pressing the metal particulates together so that the resulting structure has sufficient "green" strength to permit sintering.

In a preferred form of wet process, a stabilized suspension is prepared including a liquid medium such as that disclosed in U.S. Pat. Nos. 4,822,692, 4,828,930, or 5,149,360, all of which are incorporated by reference. The stabilized suspension of metal particulates may also include a stabilizing agent and/or a binding agent. More preferably, a single constituent, i.e., a stabilizing/binding agent, serves both to stabilize the dispersion of metal particulates and, upon drying of the suspension, to bind the individual particulates to each other and provide the requisite unsintered or green strength.

Typically, the stabilized suspension of metal particulates is prepared using a carrier formed by combining the stabilizing/binding agent with the liquid medium which is preferably water for ease of use and disposal. A preferred stabilizing/binding agent comprises from about 0.1% to about 2% of the total weight of the carrier. A variety of stabilizing/binding agents may be used. Polyacrylic acids are particularly desirable. In general, polyacrylic acids with molecular weights from about 1,000,000 to about 4,000,000 are suitable. Examples of such acids are CARBOPOL® 934 and CARBOPOL® 941, manufactured by B. F. Goodrich Chemical Co. CARBOPOL® 934 has a molecular weight of about 3,000,000 and CARBOPOL® 941 has a molecular weight of about 1,250,000. Other materials which can be used include carboxyethyl cellulose, polyethylene oxide, sodium alginate, carboxymethyl cellulose, guar gum, methyl cellulose, and locust bean gum. In general, when water is used as the liquid medium, water-compatible stabilizing/binding agents which volatize and/or decompose substantially completely prior to or during sintering may be used.

By way of example, in a carrier formed from a CARBOPOL® 934/water mixture, where the CARBOPOL® 934 comprises about 1.4% by weight (based on the weight of the carrier), the viscosity of the carrier is approximately 1250 cp at 20° C. Mixtures of CARBOPOL® 934 and water are preferred carriers because the combination provides compositions having viscosities which are substantially consistent and readily reproducible. Based on the diameter and the length of the largest metal fibers of the metal particulate to be suspended, the viscosity of the carrier that will render the suspension sufficiently stable can be determined. The desired viscosity of the carrier is that which is capable of holding the metal particulates in suspension and thereby maintaining a substantially uniform dispersion prior to lay down in a formation step to be described below. For example, a viscosity in the range from about 1000 cp to about 4000 cp is suitable for the preferred nonlinear fibers previously discussed. Viscosity is adjusted by varying the amount of stabilizing/binding agent in the carrier. In general, a lower carrier viscosity is desired and hence less stabilizing/binding agent may be used with finer metal particulates since there is a reduced tendency for finer particulates to settle out.

The carrier is preferably mixed until uniform dispersion of the stabilizing/binding agent is obtained. The fiber-containing metal particulates are then added and mixed with the carrier to provide a uniform stabilized dispersion or suspension of the particulates in the carrier. The weight ratio of the particulates to the carrier is typically from about 1:20 to about 1:2.

An additive such as a ceramic material, for example, mullite, may be mixed with the stabilized suspension to aid in protecting the sintered metal medium during exposure to high temperatures.

In a "lay down" type wet process for forming a sintered fiber metal medium, the suspension of particulates dispersed in the carrier is injected into a mold defining a cavity. To enhance uniformity of the suspension, the mold may be rotated during the injection. Preferably, the mold is rotated at about 200 rpm or less. The cavity may be of any shape corresponding to the desired shape of the filter.

The bottom of the cavity is provided with drainage ports, such as a mesh having openings, which allow the carrier to drain from the cavity while retaining the metal particulates. The suspension is then pressure filtered or vacuum filtered to remove the carrier from the suspension. Pressure filtration may be carried out by inserting an annular ram into the mold at the top of the cavity and driving the ram such that the liquid is forced from the cavity through the drainage ports. Consequently, the ram compresses the metal particulates and mechanically interlocks them with one another while the carrier is expelled from the mold through the drainage ports. The preferred amount of pressure exerted on the structure to adequately compress the structure is from about 10,000 to about 80,000 psi, more preferably from about 20,000 to about 60,000 psi.

Vacuum filtration involves applying a vacuum to the drainage ports and withdrawing the liquid from the cavity. Depending on the level of vacuum, the metal particulates may be compressed and mechanically interlocked as with pressure filtration. Generally, however, the degree of compression is less than with pressure filtration.

The resulting compressed metal particulate structure is removed from the mold and dried. Drying is preferably conducted in a convection oven at a temperature from about 100 to about 210° F. for about 30 to about 45 minutes or longer. The individual particles of the structure are further bonded to one another by the stabilizing/bonding agent during drying, such that the structure has sufficient strength to maintain its integrity and shape during further processing.

The metal particulate structure is then fiber processed by sintering to yield a sintered fiber metal medium. Sintering may be performed by placing the structure in a furnace, such as a vacuum furnace, an inert atmosphere furnace, or a reducing atmosphere furnace. Sintering removes volatile material and fuses the individual particles of the metal particulates to each other at the junctions of the metal fibers, and if present, the metal powder, with voids being defined between the metal particulates.

The sintering temperature may be selected based on the materials of which the metal particulates are formed. The sintering may be either solid state diffusion sintering or liquid phase sintering. For solid state diffusion sintering of stainless steel metal fibers, a temperature in the range of from about 1600 to about 2550° F., more preferably from about 1900 to about 2525° F., for a period of time from about ½ hour or less to about 8 hours or more has been found adequate. When lower melting materials are used, the sintering temperature is adjusted accordingly. For example, with bronze particulates, temperatures in the range from about 1300 to about 1900° F. are adequate for solid state diffusion sintering.

When sintering is complete, the resulting sintered metal medium is cooled and then removed from the furnace. Upon cooling, the sintered metal medium may be easily handled due to the formation of sinter bonds at the junctions of the particulates.

In a dry process for forming a sintered fiber metal medium, in which no liquid suspension or carrier is used, dry metal particulates are introduced into a mold through a sifter. Preferably, the mold is filled with the particulates. While the particulates are being introduced into the mold, the mold may be rotated as explained above regarding the lay down step for wet processes.

In a particularly preferred procedure for introducing the metal particulates, the mold includes a core section and a sleeve section. The core section has a conical upper portion and a cylindrical lower portion. The sleeve section surrounds the cylindrical lower portion of the core section, defining an annulus between the sleeve section and the cylindrical lower portion of the core section. The metal particulates are introduced into the mold by sifting them onto the conical upper portion of the core section. The particulates fall by gravity onto the conical upper portion, slide down the conical surface of the conical upper portion and accumulate in a random fashion in the annulus between the cylindrical lower portion of the core section and the sleeve section. This procedure provides a more even distribution of particulates in the mold than other procedures since, among other things, the uniformity of the distribution is not a function of the rate at which the particulates are introduced into the mold.

As an example of a nonpreferred procedure, the tip of a funnel may be positioned over the annulus in the mold and particulates may be sifted into the funnel as the tip of the funnel travels around the annulus. Multiple layers of the particulates then accumulate in the mold. Sometimes referred to as "felting in planes", this procedure can produce uneven particulate distribution, especially if the speed of travel of the funnel and the rate of introduction of the particulates are not closely controlled.

However the particulates are introduced into the mold, once they are deposited in the mold, they are compressed in the mold to form a compressed particulate structure. Compression may be carried out by inserting an annular ram into the mold. The ram is driven downward into the mold at any suitable pressure for providing a desired permeability. Alternatively, to reduce the density gradient over the height of the filter, the particulates may be compressed by driving a first ram downward and driving a second ram upward so that the particulate material is compressed from two directions. The force applied to the particulates is similar to that described above for the "lay down" wet process.

The permeability of the resulting compressed structure may be rendered more uniform by adding a dry lubricant to the metal particulates before compression. Stearic acid and zinc stearate are preferred dry lubricants, but other lubricants well known to those skilled in the art may also be used.

When the metal particulates include nonlinear fibers, there is considerable mechanical interlocking during the dry laying and compressing steps.

After compression, the resulting compressed metal particulate structure is removed from the mold. The structure has enough green strength so that it can be readily handled and transported. It is then sintered as described above. During sintering, the dry lubricant is burned off and sinter bonds are formed at the junctions of the fibers and, if present, the metal powder with voids extending between the metal particulates.

Regardless of which of the above processes are used to form the fiber metal medium, it may be further processed by mechanical means either before or after sintering. For example, the sintered metal medium may be machined, cut, rolled, coined, or swaged to obtain a desired shape. It may also be welded, brazed, and/or resintered.

A sintered fiber metal medium for use in a filter according to the present invention may have a permeability and/or voids volume that varies. The permeability and/or voids volume of the sintered metal medium can be varied by a variety of methods. For example, a low permeability region can be formed by mechanical compression of a high permeability region. When the sintered metal medium is manufactured using the above-described wet process, a more preferred method of varying the permeability is to use a plurality of different suspensions, each suspension resulting in a different permeability. For example, one suspension may contain metal particulates of smaller nominal particle size, e.g., smaller filter diameter than the particulates contained in the other suspension(s) and/or that are of a different shape than the particulates contained in the other suspension (s). In addition, the suspensions may contain concentrations of particulates which differ from each other. Alternatively, a ceramic material may be added to the particulate material used in one of the suspensions. The different suspensions can be inserted sequentially into a mold as layers, resulting in layers of different permeability.

A sintered fiber metal medium having regions of high and low permeability and/or voids volume may also be constructed by modifying the dry process in a manner similar to that described above with respect to the wet process. That is, the dry process may be modified by adding quantities of metal particulates in alternate layers having different permeability or voids volume.

EXAMPLE

A test filter according to the present invention was assembled and subjected to an accelerated loading test to measure the ability of the filter to capture soot particles in air.

The test filter included a prefilter and two layers of a sintered metal medium.

The prefilter comprised twenty-five disk-shaped layers of unsintered woven wire mesh of stainless steel wire with a wire diameter of 0.004 inches. The layers were stacked atop each other to obtain a total thickness of 0.675 inches. The prefilter had a diameter of 3.325 inches and a voids volume of 98.93%.

Each layer of the sintered metal medium was in the form of a disk with a diameter of 3.325 inches formed of a sintered fiber metal medium. The first layer comprised stainless steel fibers formed by the melt overflow casting process and having a nominal diameter of 0.003 inches (fiber diameters were predominantly in the range of 50–75 µm). This layer had a thickness of 0.170 inches and a voids volume of 85.60%. The second or downstream layer comprised stainless steel fibers formed by bundle drawing and having a nominal diameter of 0.001 inches (fiber diameters were predominantly in the range of 20–30 µm). This layer had a thickness of 0.155 inches and a voids volume of 92.70%.

The total thickness of the prefilter and the two sintered metal layers was 1.0 inches. These three components were clamped in a frame with the first sintered metal layer sandwiched between the prefilter and the second sintered metal layer.

The test filter was installed in a test fixture which included a conduit through which air could be passed at a controlled rate. The test filter was oriented with the prefilter on the upstream side of the test filter. The frame in which the prefilter and the sintered metal layers were clamped somewhat overlapped the outer periphery of the upstream surface of the prefilter, so the portion of the upstream surface of the prefilter directly exposed to air was a circular region with a diameter of 3.0 inches. An absolute filter containing a fiberglass medium capable of removing essentially 100% of the particles in the test dust mixture to be used was installed in the test fixture downstream of the test filter so that all air passing through the test filter would also pass through the absolute filter.

An air flow of 73.6 SCFH (velocity of 25 FPM at the face of the test filter) was established through the test filter using a suction pump located downstream of the test filter and was maintained constant throughout the test. The test was carried out at room temperature. In the test, a test dust mixture was gradually sprayed into the air flow on the upstream side of the test filter at a constant rate of 10 grams per 20 minutes. The test dust mixture, which simulated the sooty particles in the bleed air from an auxiliary power unit of an aircraft, consisted of 3 parts by weight of SAE fine test dust (having a prescribed particle size distribution in the range of 0–80 µm) and one part by weight of carbon black (typically having a particle size of at most 1 µm). Prior to the test, the test dust mixture was dried in an oven to drive off moisture.

As the air flow was passing through the test filter, the pressure drop across the test filter was measured every 20 minutes. Addition of the test dust mixture to the air flow was continued for 4 hours, at which time the air flow was stopped and the test filter and absolute filter were carefully removed from the test fixture. After any metal fibers which had been dislodged from the test filter were removed from the absolute filter, the absolute filter was baked in an oven and then weighed. A dirt cake which formed on the upstream surface of the prefilter was carefully removed from the prefilter and weighed. The prefilter and the two sintered metal layers were also removed from the frame of the test filter and individually weighed along with their entrained particles. The weight of particles captured by each portion of the test filter was determined by subtracting the clean weight of each portion at the start of the test. A small amount of the test dust mixture was not recovered by the test filter or the absolute filter and was assumed to have adhered to the internal surfaces of the test fixture upstream of the test filter. The filtration efficiency of the test filter as a whole was calculated from the total weight of test dust particles captured by the test filter divided by the total weight of the test dust particles captured by the test filter and the absolute filter.

The results of the weight measurements were as follows:
(a) Total weight of test dust mixture added to air flow during test: 120 grams
(b) Weight of particles in dirt cake: 89.8 grams
(c) Weight of particles in prefilter: 28.10 grams
(d) Weight of particles in upstream sintered metal layer: 1.646 grams
(e) Weight of particles in downstream sintered metal layer: 0.029 grams
(f) Weight of particles in absolute filter: 0.07 grams
(g) Total weight recovered=(b) through (f): 119.645 grams
(h) Total weight recovered by test filter=(b) through (e): 119.575 grams Filtration efficiency=$(h)/(g)\times 100 = 119.575 g/119.645 g \times 100 = 99.94\%$ A filter according to the present invention was thus able to capture soot particles resembling those found in engine bleed air with an extremely high efficiency.

In the above descriptions, certain features of the present invention are described in connection with only certain embodiments. However, any of the various features of one embodiment may be combined with any of the features of a different embodiment to obtain arrangements other than those specifically shown in the drawings without departing from the scope of the present invention.

What is claimed is:

1. An engine arrangement comprising:
   an aircraft engine including a gas turbine having a bleed gas line; and
   a filter in fluid communication with the bleed gas line and including a sintered metal medium.

2. An arrangement as claimed in claim 1 wherein the sintered metal medium comprises a fiber metal medium.

3. An arrangement as claimed in claim 2 wherein the fiber metal medium comprises fibers having a nominal length of from about 100 µm to about 20 mm.

4. An arrangement as claimed in claim 2 wherein the sintered metal medium has a voids volume from about 50% to about 95%.

5. An arrangement as claimed in claim 2 wherein the fiber metal medium comprises fibers having a diameter from about 1 to about 150 µm.

6. An arrangement as claimed in claim 5 wherein the fibers have a diameter from about 10 to about 125 µm.

7. An arrangement as claimed in claim 6 wherein the fibers have a diameter from about 20 to about 100 µm.

8. An arrangement as claimed in claim 2 wherein the fiber metal medium comprises metal fibers formed by melt overflow casting and having a diameter of greater than about 40 µm.

9. An arrangement as claimed in claim 8 wherein at least a portion of the fibers are mechanically worked prior to sintering to impart nonlinearity.

10. An arrangement as claimed in claim 9 wherein at least a portion of the fibers are mechanically worked with a hammermill to impart nonlinearity.

11. An arrangement as claimed in claim 8 wherein at least a portion of the fibers have a generally crescent-shaped transverse cross section defining an arc of at most about π radians.

12. An arrangement as claimed in claim 2 wherein the filter includes a prefilter disposed on an upstream side of the sintered metal medium and having a voids volume of at least 90%.

13. An arrangement as claimed in claim 12 wherein the prefilter comprises a knit mesh pad.

14. An arrangement as claimed in claim 12 wherein the prefilter and the sintered metal medium together have a capture efficiency of at least 95% for soot particles having a diameter of about 1–5 μm in bleed gas from the bleed gas outlet.

15. An arrangement as claimed in claim 14 wherein the prefilter and the sintered metal medium together having a capture efficiency of at least 99% for soot particles having a diameter of at least 5 μm in bleed gas from the bleed gas outlet.

16. An arrangement as claimed in claim 1 wherein the engine comprises an auxiliary power unit for an aircraft.

17. An arrangement as claimed in claim 1 including a surge control valve connected to the engine, wherein the filter is fluidly connected between the bleed gas line of the engine and the surge control valve.

18. An arrangement as claimed in claim 1 wherein the filter includes a hosing containing the filter, the housing comprising a body having an inlet connected to the bleed gas line, and a cover detachably mounted on the body and removable from the housing body without disconnecting the inlet from the bleed gas line.

19. An arrangement as claimed in claim 18 including a sealing member forming a seal between the body, the cover, and the filter.

20. An arrangement as claimed in claim 18 wherein the filter is shaped to prevent the cover from being closed atop the filter with the filter upside down in the housing.

21. An arrangement as claimed in claim 20 wherein the filter has a first outer diameter small enough for the cover of the housing to fit over and a second outer diameter too large for the cover to fit over.

22. An arrangement comprising:
a source of gas containing soot particles having a diameter of about 1 μm to about 5 μm, the source of gas including a bleed line of a gas turbine engine; and
a filter in fluid communication with the source of gas and including a sintered fiber metal medium having a voids volume from about 50% to about 95% and comprising metal fibers having a diameter from about 20 μm to about 100 μm.

23. An arrangement as claimed in claim 22 wherein the metal fibers include fibers formed by melt overflow casting having a diameter of greater than about 40 μm.

24. A soot filter for removing soot particles from bleed gas from an engine comprising:
a sintered fiber metal medium having a voids volume of about 50% to about 95% and including metal fibers having a diameter of about 20 μm to about 100 μm and a nominal length of at least about 100 μm,
the sintered fiber metal medium having an upstream surface communicating with bleed gas containing soot particles, a downstream surface communicating with the filtered bleed gas, and a bore extending through the sintered fiber metal medium between the upstream surface and the downstream surface.

25. A filter as claimed in claim 24 further comprising a prefilter upstream of the sintered metal medium, wherein the prefilter comprises a metal filter medium having a voids volume of at least about 90%.

26. A filter as claimed in claim 24 wherein the prefilter and the sintered metal medium are each disk-shaped and have an aligned bore.

27. A filter as claimed in claim 26 including a ring surrounding an outer periphery of the prefilter and the sintered metal medium.

28. A filter as claimed in claim 27 wherein the sintered metal medium is sealed against an inner periphery of the ring.

29. A filter as claimed in claim 28 wherein the sintered metal medium is press fit inside the ring.

30. A filter as claimed in claim 27 wherein the ring has a varying outer diameter.

31. A filter as claimed in claim 27 including first and second retainers disposed at first and second ends of the ring, the prefilter and the sintered metal medium being sandwiched between the first and second retainers.

32. A filter as claimed in claim 24 wherein the sintered metal medium comprises first and second disks, the first disk being disposed between the second disk and the prefilter, and the first disk having a larger average pore size than the second disk.

33. A filter as claimed in claim 32 wherein the first disk has a larger average fiber diameter than the second disk.

34. A filter as claimed in claim 33 wherein the first disk contains fibers formed by melt overflow casting having a crescent-shaped transverse cross section.

35. A filter assembly for removing soot from gas from an engine comprising:
a housing including a housing body and a cover disposed on the housing body, the housing body having an inlet for connection to a bleed gas line of an engine and an outlet, the cover being removable from the housing body without breaking fluid lines to the inlet or outlet; and
a disk-shaped filter disposed in the housing along a flow path between the inlet and the outlet and capable of removing soot particles having a size of 1–5 μm from gas from an engine.

36. A filter assembly as claimed in claim 35 wherein the filter includes a sintered metal medium.

37. A filter assembly as claimed in claim 35 wherein the housing is arranged to guide gas to be filtered axially through the filter.

38. A filter assembly as claimed in claim 37 wherein the housing includes a feedpipe for gas to be filtered communicating with the inlet and extending through a bore in the filter.

39. A filter assembly as claimed in claim 35 including a sealing member forming a seal between the body, the cover, and the filter.

40. A filter assembly as claimed in claim 35 wherein the filter is shaped to prevent the cover from being closed atop the filter with the filter upside down in the housing.

41. A filter method comprising passing bleed gas from a gas turbine of an aircraft engine through a filter comprising a fiber metal medium having a voids volume of about 50% to about 95%.

42. A filtering method as claimed in claim 41 wherein the fiber metal medium contains metal fibers having a nominal length of from about 100 μm to about 20 mm.

43. A filtering method as claimed in claim 41 wherein the fiber metal medium contains metal fibers having a diameter of from about 20 to about 100 μm.

44. A filter method as claimed in claim 43 wherein the metal fibers include fibers formed by melt overflow casting having a diameter of greater than about 40 μm.

45. A filtering method as claimed in claim 41 wherein passing bleed gas from a gas turbine of an aircraft engine comprises passing bleed gas from an auxiliary power unit of the aircraft and wherein the method further comprises supplying the bleed gas to a surge control valve for the auxiliary power unit after passing the bleed gas through the filter.

46. A filtering method as claimed in claim 41 wherein passing bleed gas through a filter includes introducing the bleed gas into a housing containing the filter, passing the bleed gas in a first direction through a bore extending through the filter, then passing the bleed gas actually through the filter in a second direction to filter the bleed gas.

47. A filtering method as claimed in claim 46 further comprising supplying the bleed gas to a surge control valve for the gas turbine engine after passing the bleed gas through the filter.

48. A filtering method as claimed in claim 47 wherein passing the bleed gas through a filter includes providing a capture efficiency of at least about 95% for soot particles in the range of about 1 $\mu$m to about 5 $\mu$m.

49. A filtering method as claimed in claim 41 wherein passing the bleed gas through a filter includes providing a capture efficiency of at least about 95% for soot particles in the range of about 1 $\mu$m to about 5 $\mu$m and wherein the method further comprises supplying the bleed gas to a surge control valve after passing the gas through the filter.

50. A filtering method as claimed in claim 41 further comprising interrupting the flow of bleed gas through the filter, replacing the filter without breaking fluid lines to a housing containing the filter, and reestablishing the flow of bleed gas from the gas turbine of an aircraft engine through the filter.

* * * * *